Nov. 16, 1926.
C. E. MAYNARD
FABRIC LAMINATING
Filed Oct. 20, 1924
1,607,409
4 Sheets-Sheet 1
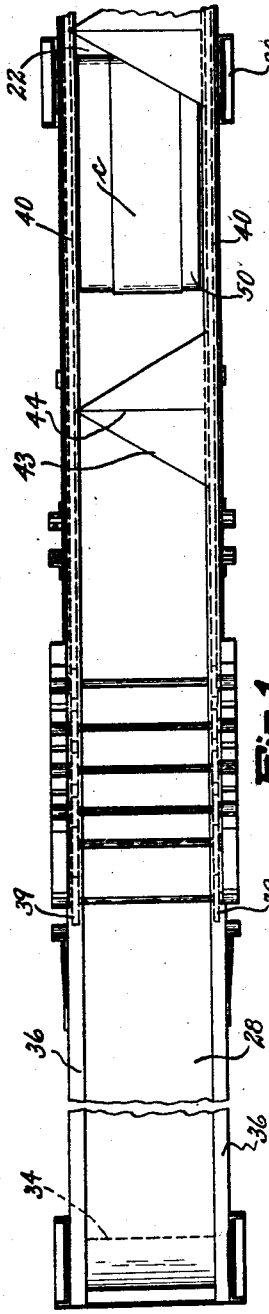
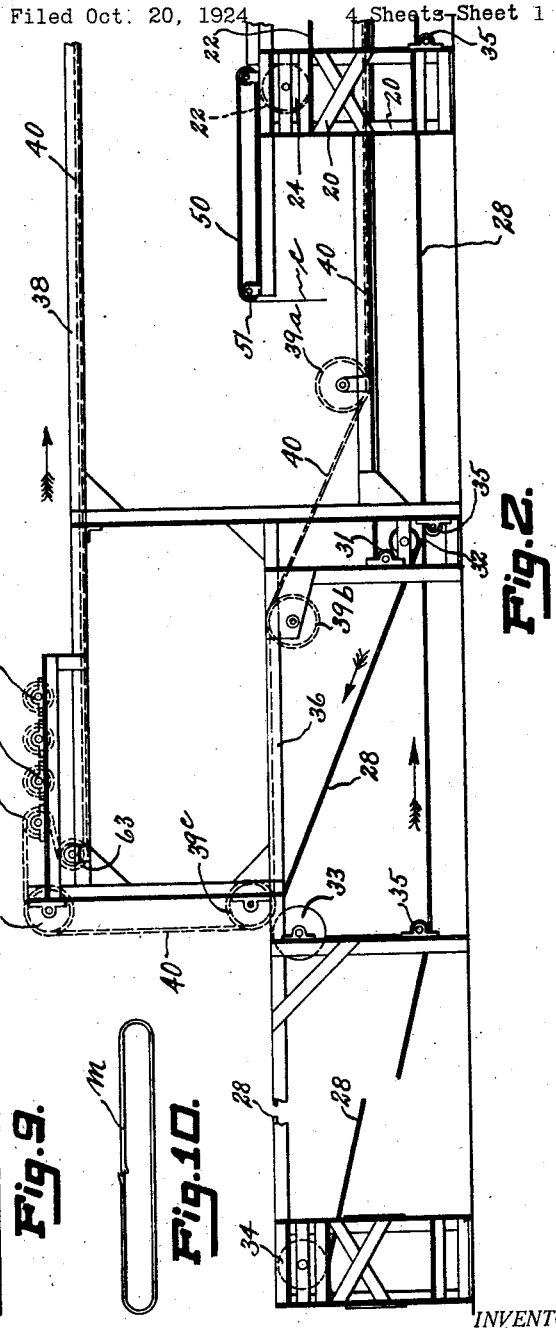
INVENTOR.
Charles Edgar Maynard
BY
Edward C Taylor
ATTORNEY.

Nov. 16, 1926.  
C. E. MAYNARD  
1,607,409  
FABRIC LAMINATING  
Filed Oct. 20, 1924   4 Sheets-Sheet 2
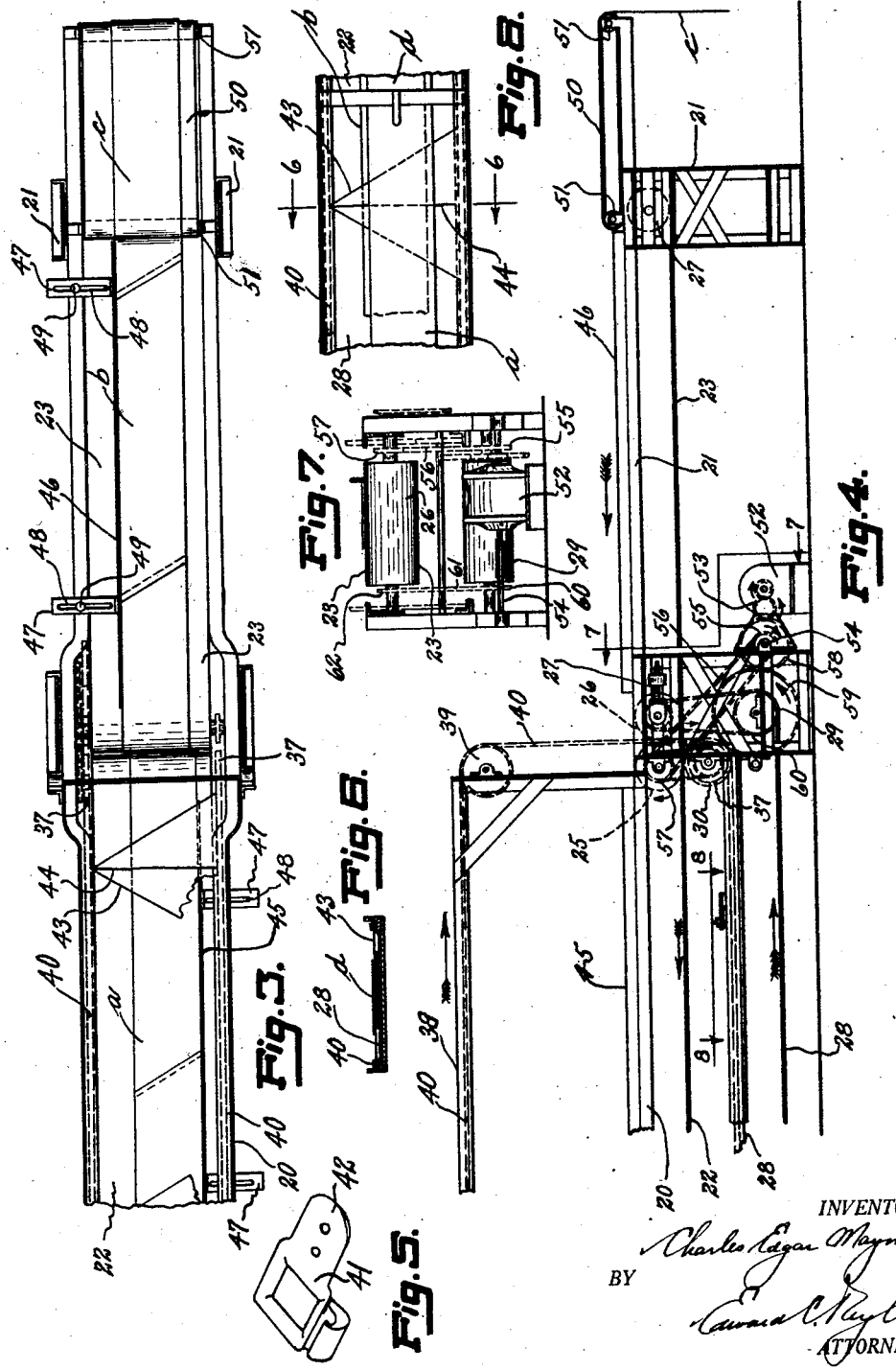
INVENTOR.  
Charles Edgar Maynard  
BY  
ATTORNEY.

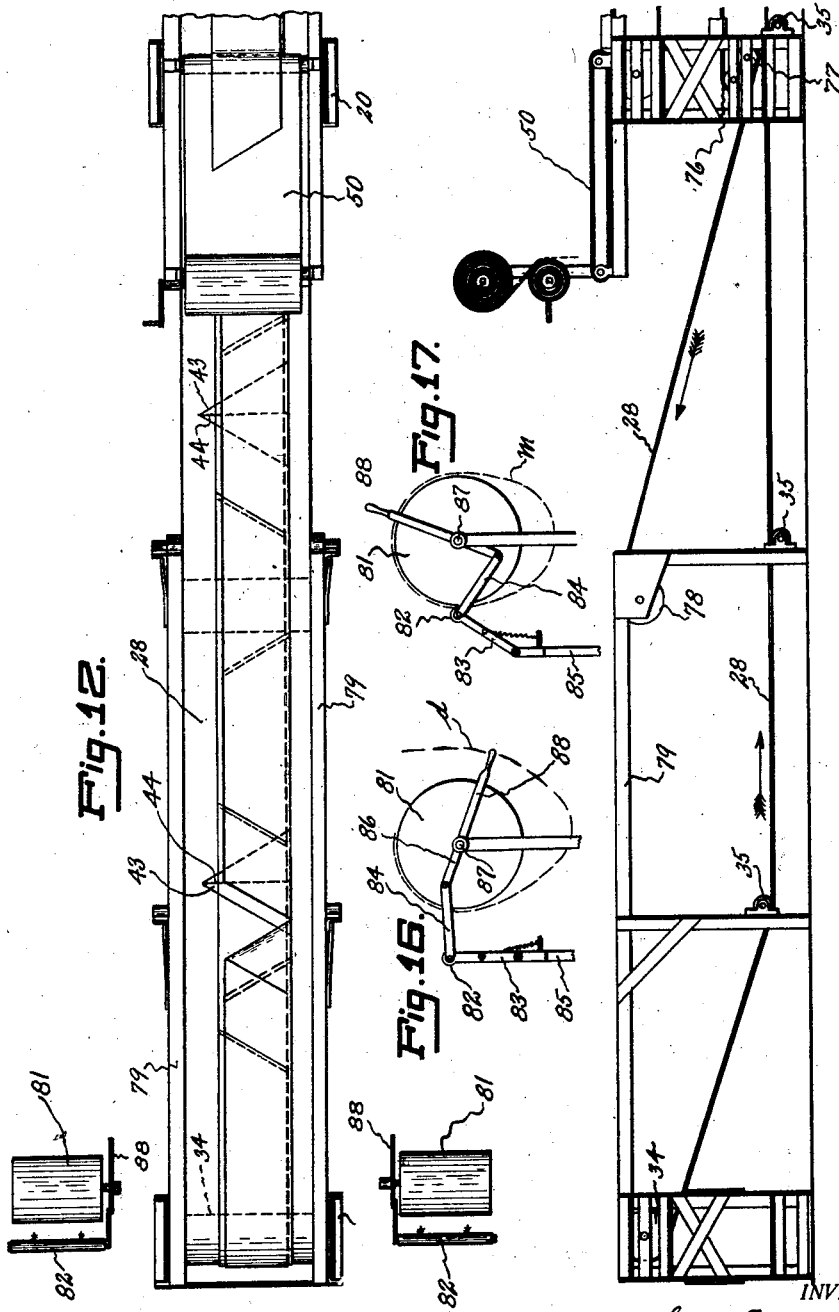

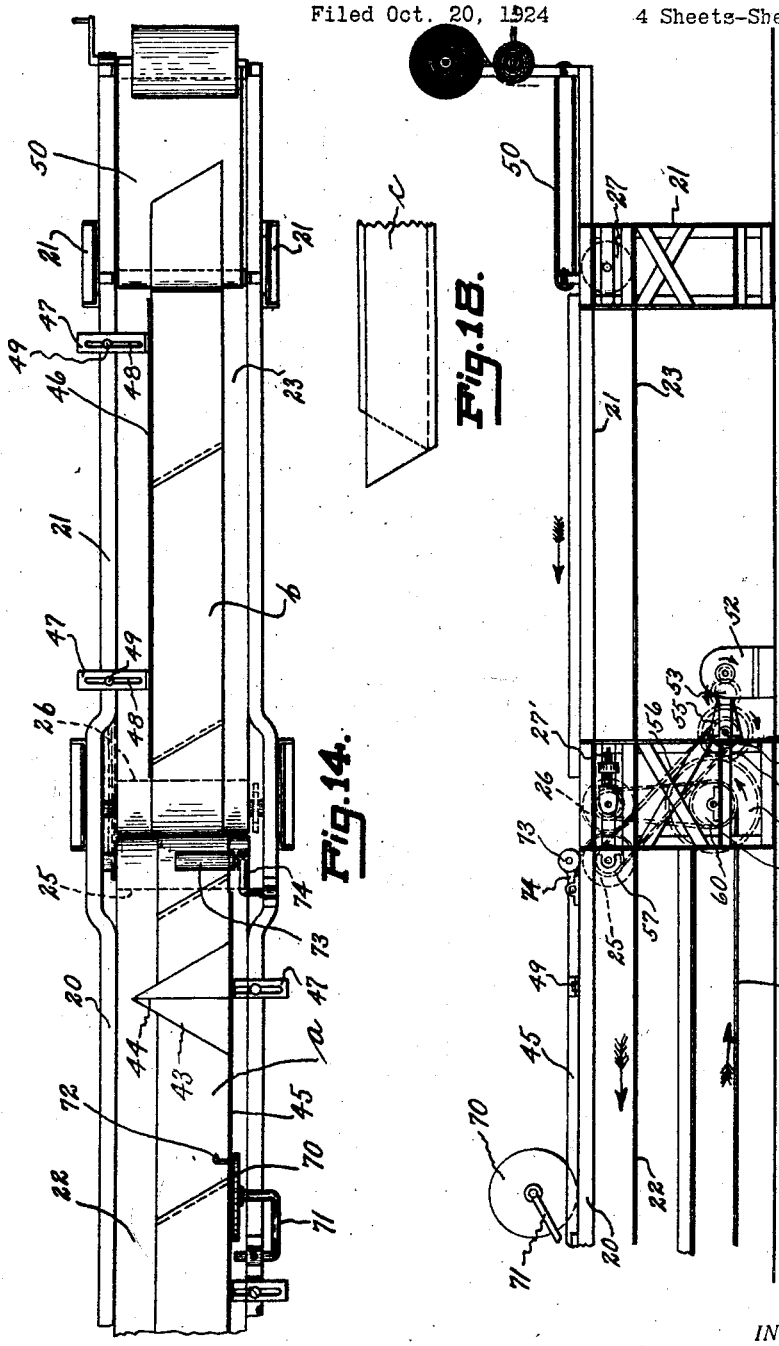

Patented Nov. 16, 1926.

1,607,409

UNITED STATES PATENT OFFICE.

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS.

FABRIC LAMINATING.

Application filed October 20, 1924. Serial No. 744,531.

This invention relates to a device for laminating fabric material, and is particularly concerned with the preparation of rubberized cord fabric for use in the building of tire casings. In this art one standard method of cord tire building requires the use of a laminated strip built up of two plies of so-called cord fabric (fabric having the strain-resisting cords or members running in one direction only), with the cords of the two layers crossing each other at an angle to the length of the strip. Either before or after application to a tire-building former the strips are cut to length and spliced to form an endless band, known as a "pocket" in the former case. Since the cords lie on the bias, and since it is undesirable to sever the cords intermediate the edges of the strip, the proper manner of cutting is parallel to the cords; but since the cords in the two layers cross each other it is impossible to sever the laminated strip as a unit without violating these requirements. It has been proposed in the patent to Little, 1,471,905, dated October 23, 1923, to permit the individual severance of the two layers by inserting a temporary separator between them as they are being laminated. The object of the present invention is the improvement of the Little method and the provision of an apparatus by which the improved method may be practiced.

Referring to the drawings,

Fig. 1 is a fragmentary top plan of one form of apparatus;

Fig. 2 is a side elevation thereof;

Fig. 3 is a continuation of Fig. 1;

Fig. 4 is a continuation of Fig. 2;

Fig. 5 is a detail of a conveyor;

Fig. 6 is a section on line 6—6 of Fig. 8;

Fig. 7 is a section on line 7—7 of Fig. 4;

Fig. 8 is a detail plan on line 8—8 of Fig. 4;

Fig. 9 is a detail of a completed pocket;

Fig. 10 is a side elevation thereof;

Fig. 11 is a fragmentary view, corresponding to Fig. 9, of a modified pocket;

Fig. 12 is a view, similar to Fig. 1, of a modification;

Figs. 13, 14, and 15 are views thereof similar to Figs. 2, 3, and 4 respectively;

Figs. 16 and 17 are diagrammatic details of a device for use in building endless bands from material laminated on the conveyor; and Fig. 18 is a detail similar to Fig. 11, but showing a modification.

In the drawings, I have shown two modifications of the invention, differing mainly in the manner of inserting the liner or separator between the two plies of material. According to the form first to be described the insertion and removal of the separator is accomplished automatically at definitely spaced intervals; while in the other form the separator is inserted and removed by operators, an indicating device pointing out the proper place. The two forms are similar, and to the extent of similarity equivalent parts will be denoted by the same reference characters. That form to be considered first is shown in Figs. 1, 2, 3, and 4.

On frames 20 and 21 respectively are carried belt conveyors 22 and 23, supported on pulleys 24, 25, 26, and 27. The pulleys 25 and 26 are placed close to each other so that, as strips of fabric carried by the two conveyors 22 and 23 are brought together and drawn between the pulleys, they will be pressed into firmly adhering contact (Fig. 3). Preferbaly one of these rolls is made adjustable with respect to the other by an ordinary belt tightening adjustment 27', so that the pressure with which the plies of fabric are forced together may be varied.

Underneath belt 22, and running in the opposite direction, is another conveyor 28 passing around a pulley 29 located under pulley 26. In the case of the modification now being described this belt passes under a roll 30, around rolls 31 and 32, over roll 33, around an end pulley 34, and back to pulley 29, being supported in this latter idle travel by guide rolls 35. The course of this belt is slightly changed in the other modification, as will appear below. The united plies of fabric drop from the bite of rolls 25 and 26 onto the conveyor 28, and are carried by it in the latter's course over frame 36 upon which the rolls 33 and 34 are supported.

Secured on the shaft of roll 30 are a pair of sprockets 37, and secured at various points to frames 20 and 36 and to a superstructure 38 are pairs of sprockets 39, serving to guide chains 40. To these chains are secured in any suitable way, as by the use of links 41 (Fig. 5) having riveting flanges 42, separating pieces 43 of substantially triangular form, conveniently made of cloth and having guide lines 44 ruled across them from the apex perpendicular to the base of the triangle. As the two plies of fabric $a$ and $b$ converge between the pulleys 25 and 26, the chains 40 lead separators 43 between them at properly spaced intervals. Thereafter the path of the chain-supported liners is the same as the path of the laminated strip as carried by belt 28, except that I prefer to have the separator carrying chains rise above the surface of the belt as the latter approaches the top of frame 36. If desired, however, the paths may coincide at this point. At a point between sprockets 39$^b$ and 39$^c$ the operator tears the upper ply of fabric, as will be described more fully below, and turns back the part of the fabric overlying the liner. If the preferred construction is adopted the laminated sheet, which has been held to the path of chains 40 by the separator 43, drops to belt 28 while the chains, with the liner still supported between them, pass around sprockets 39 on the start of their return journey back to pulleys 25 and 26.

Guides 45 and 46 are secured to frames 20 and 21 respectively, above and in substantial contact with belts 22 and 23, serving to permit accurate placing of the plies of fabric on the belt. Preferably these guides are secured by members 47 having slots 48 through which extend bolts 49 attached to the frame. By tightening nuts on these bolts the guides can be secured in any desired adjusted condition.

Extending slightly over the remote ends of belts 22 and 23 are idle belts 50 passing around pulleys 51. While not necessary for the operation of the device these belts are a convenience in assembling the fabric strips, as will appear more fully during the description of the operation of the device.

The power for operating the various conveyors is conveniently derived from a motor 52 connected by gearing 53 to a countershaft 54. A sprocket 55 on this shaft is connected by a chain 56 to a sprocket 57 on the shaft of pulley 25. A gear 58 on the countershaft 54 meshes with a gear 59 on the shaft of pulley 29, while a sprocket 60 on this latter shaft is connected by a chain 61 with a sprocket 62 on the shaft of pulley 26.

As a convenience in the adjustment of the chains 40 for different spacings of the separators, the chains are caused to pass around pairs of sprockets 63 and 64 (Fig. 2), the latter of which have adjustable bearings 65. To change the spacing of the separators the flanged links 41 are re-distributed, and such additional regular links as are necessary are added or withdrawn. The consequent change in the length of chain is taken care of by the several bearings 65.

The operation of this form of device may now be described. An operator standing beside each of the guides 45 and 46 splices into continuous lengths $a$ and $b$ respectively, a series of bias cut strips $c$ of the usual tire building material, using the guides to locate the strips accurately on the conveyor. The strips may be placed on belts 50 by another operator who receives them from a conveyor or from any other source. These free running belts are of assistance in splicing as their speed is not governed by that of the underlying belts 22 and 23, and hence the operator doing the splicing can adjust the ends of the strips accurately, the strip which is being added being held out of contact with the belts 22 and 23 until it is pulled off belts 50 by the advancing continuous strip.

The two continuous strips thus formed are carried by their respective conveyors 22 and 23 between pulleys 25 and 26, which press them into firm adherence forming a laminated strip $d$. At intervals separators 43 are introduced between the two strips by the chains 40 and travel between them through pulleys 25 and 26, preventing adherence of the strips at these places. When the chains carrying the separators reach sprockets 39$^a$ they are raised from belt 28, carrying the laminated strip with them. After the chains again reach a horizontal travel another operator tears the upper ply of material on a bias line corresponding to the strain-resisting elements in the material, starting with the point on one side of the fabric marked by the central ruled line 44 of the separator (see left of Fig. 12), and turns back the torn end. The weight of the strip will cause it to drop back upon conveyor 28, releasing it from the separator and turning back the other flap of the upper ply. When the belt 28 has carried the partially torn strip past the vertical flight of chains 40 the operator tears the underneath ply, starting from the same point as before but proceeding in the opposite direction. The strip thus severed will have the appearance shown in Fig. 18 when the flaps turned back for convenience in tearing, are straightened out. The torn off strips are removed from conveyor 28 as fast as they are prepared, and may be spliced into endless bands $m$ (Figs. 9 and 10) or stored flat.

The second form of the invention is somewhat simpler in construction but follows generally the outline above except that the chains carrying the separators are omitted, the separators being in this case applied manually to one of the strips. As a guide for locating the separators a disk 70 is rotatably mounted on a bracket 71 at one side of conveyor 22, and carries a pointer or marker 72. The disk is pressed into contact with the conveyor and is rotated therewith, indicating by the pointer or marker the location of the ruled center line 44 of the separator. An operator may place the separator 43 with its center line directly under the pointer or may make a crayon mark where the pointer comes and place the separator later. Or the pointer may be replaced by an inking or other marking device. To change the spacing of the separators it is only necessary to replace the disk by another having a different circumference.

A freely rotating roll 73 is mounted on a bracket 74 near the top of pulley 25 or slightly down towards the bite of the two conveyors 22 and 23, resting lightly against the conveyor 22 to guide the separators smoothly between pulleys 25 and 26. Were this roll not used there would be danger of the separators bridging the gap between the conveyors and being folded as they were carried between the rolls. The only other difference worth noting between the two forms is that belt 28 preferably has a slightly changed path, passing around rolls 76 and 77, which serve to change its direction without requiring the laminated strip to pass between the belt and a pulley, and over a roll 78 to table 79.

The operation of this form of device is substantially that of the modification previously described, except that the separators are put in by hand instead of automatically and that the laminated strip is supported at all times during tearing by the belt 28. As the laminated strip is brought upon the table by belt 28 the operator tears the upper strip along the line of cords, starting from one edge at the point marked by line 44 on the separator, removes the separator, and tears the under strip along the line of its cords, which preferably run in the opposite direction from those in the upper strip.

The strips may be spliced into endless band form upon devices comprising a drum 81, smaller than the band to be made and provided with a roller 82 which can be pressed against it. As shown this roller is mounted on links 83 and 84, the former of which is pivoted to a standard 85 and the latter to an arm 86 pivoted at 87 and having a handle 88. The splice is made by hand around the drum as in Fig. 16, and then, with the roller pressed against the drum as in Fig. 17, the drum is rotated to pass the splice past the roller to thoroughly bond the splice together.

The guides 45 and 46 can be arranged to produce laminated material of the type shown in Fig. 18, in which the plies are of equal width and the desirable step-off at the sides is obtained by having the plies overlap; or of the type shown in Fig. 11, where the overlap is obtained by having one ply wider than the other. The former method is preferred, as the overall width of the laminated strip will be kept constant by the guides irrespective of variations in the widths of the separate plies due to errors in cutting.

Having thus described my invention, I claim:

1. An apparatus of the class described comprising a pair of belt conveyors each adapted to receive a continuous strip of tire-building material, pulleys over which the belts pass arranged close together so as to cause the two strips of material to be pressed by the belts into adhesive contact, and means for introducing between the pulleys at measured intervals a series of members serving to prevent adhesive contact of the strips.

2. An apparatus of the class described comprising a pair of belt conveyors each adapted to receive a continuous strip of tire-building material, pulleys over which the belts pass arranged close together so as to cause the two strips of material to be pressed by the belts into adhesive contact, a conveyor carrying between the pulleys at measured intervals a series of strip separators, and a fourth conveyor receiving the laminated strip from the pulleys and transporting it into position for further treatment, said third and fourth conveyors traveling together for a portion of their travel and then diverging.

3. An apparatus of the class described comprising supplies for two strips of tire-building material, rolling means for pressing the strips progressively into adhesive contact, and means for introducing at measured intervals a series of separators between the strips.

4. A method of preparing endless band material in unstretched condition for use in tire building, which consists in pressing together into permanent adhesive contact a pair of continuous flat webs of unstretched bias-cut rubberized cord fabric, while leaving at spaced intervals, equal in length to the circumference of the band, areas where the strips are not pressed into permanent adherence; severing the two plies of the laminated web along opposite angles at each of said non-adhering portions; and joining the ends of each of the thus-severed two-ply strips while still flat transversely and in unstretched condition, to produce a flat endless band of uniform elasticity adapted to be later stretched throughout a complete circumference to shape it into tire form for the construction of a tire casing.

5. A method of preparing and applying carcass-building material in the building of tire casings which comprises uniting lengths of bias-cut rubberized cord-fabric into two continuous strips, pressing the two strips into adhesive contact with separating members inserted between them at predetermined distances, tearing one of the strips where thus separated from the other, removing the separator, tearing the other strip, splicing into endless flat band form the strips so produced while keeping them flat and substantially free from stretch and from lateral distortion and stretching the bands over tire-building forms.

6. An apparatus for producing laminated strips of bias cut material ready for splicing into endless bands, comprising a pair of substantially horizontal conveyors in substantially horizontal alignment and leading to a common point and each presenting a substantially horizontal moving surface, accessible for the laying and splicing into a continuous length of a series of bias cut strips, means for pressing together the two continuous strips thus formed, and a conveyor adapted to receive the two-ply strip from the pressing means and to present a moving surface upon which the two-ply strip may be separated into lengths.

7. An apparatus for producing laminated strips of bias cut material ready for splicing into endless bands, comprising a pair of substantially horizontal conveyors leading to a common point and each presenting a substantially horizontal moving surface, accessible for the laying and splicing into a continuous length of a series of bias cut strips, means for pressing together the two continuous strips thus formed, a conveyor adapted to receive the two-ply strip from the pressing means and to present a moving surface upon which the two-ply strip may be separated into lengths, and means for indicating the desired intervals at which said strip is to be separated.

8. An apparatus for producing laminated strips of bias cut material ready for splicing into endless bands, comprising a pair of substantially horizontal conveyors in substantially horizontal alignment and leading to a common point and each presenting a substantially horizontal moving surface, accessible for the laying and splicing into a continuous length of a series of bias cut strips, and means for pressing together the two continuous strips thus formed.

9. An apparatus for producing laminated strips of bias cut material ready for splicing into endless bands, comprising a pair of substantially horizontal conveyors leading to a common point and each presenting a substantially horizontal moving surface, accessible for the laying and splicing into a continuous length of a series of bias cut strips, means for pressing together the two continuous strips thus formed, and means for indicating the desired intervals at which the two-ply strip is to be separated into lengths.

10. An apparatus of the class described comprising a pair of belt conveyors each adapted to receive a continuous strip of tire-building material, pulleys over which the two belts pass arranged close together so as to cause the two strips of material to be pressed by the belts into adhesive contact, and guides for the edges of the two strips arranged one on each conveyor but on opposite sides of the path of movement of the strips, whereby a constant width of the laminated strip can be maintained irrespective of variations in the width of the individual strips.

11. A method of producing laminated endless bands of cord fabric which comprises pressing together a pair of continuous webs of bias-cut rubberized cord fabric with their cords disposed at opposite angles, inserting between the webs at spaced intervals prior to their being pressed into contact with each other a substantially triangular piece of material substantially non-adherent with respect to the rubberized fabric, said triangular piece being placed with its base parallel with the edges of the webs, severing one ply of material along the line of its cords starting at one side adjacent the apex of the triangle, removing the triangular piece, severing the other ply from the same starting point but along the line of its cords, and joining together the single ply portions so formed at the two ends of each strip to form thereby an endless band.

12. As a separator for spaced portions of multi-ply rubberized cord fabric strips, a substantially triangular piece of flexible material substantially non-adherent with respect to the rubberized strips and having a guide line marked thereon from the center of the base to the apex.

CHARLES EDGAR MAYNARD.